United States Patent Office 3,224,834
Patented Dec. 21, 1965

3,224,834
CHEMICAL COMPOSITION
Frederick W. Frey, Jr., and Roy J. Laran, Baton Rouge, La., assignors to Ethyl Corporation, New York, N.Y., a corporation of Virginia
No Drawing. Filed Apr. 27, 1962, Ser. No. 190,835
2 Claims. (Cl. 23—14)

A novel titanium-, nitrogen-, and oxygen-containing composition and a process for its manufacture are provided by this invention.

According to this invention, a new, complex material of considerable utility is prepared by reacting titanium tetraperchlorate with an excess of nitrogen dioxide ($N_2O_4$). In this reaction, use can be made of liquid nitrogen dioxide or nitrogen dioxide vapor. The reaction can be conducted at about room temperature under appropriate pressure conditions. Reaction periods range from up to three days down to 3–4 hours or less even at room temperature.

The products produced by the above process defy characterization. The available experimental evidence definitely indicates that the products contain a proportion of titanium tetranitrate [$Ti(NO_3)_4$] in association with $NOClO_4$. It is also possible that the product contains greater or lesser quantities of the complexes $$Ti(ClO_4)_4 \cdot N_2O_4$$

and $Ti(ClO_4)_4 \cdot 3N_2O_4$. Concerted attempts to completely characterize the product or products produced by this reaction have failed to pin down the precise make-up of the product, even though recourse was had to quantitative measurements of weight increase during reaction, ceric sulfate titrations, elemental analyses, and infra-red spectroscopy. Nevertheless, it has been established without question that the product does contain titanium, nitrogen, and oxygen in chemical combination.

To illustrate the process of this invention, a series of reactions was conducted in which either liquid $N_2O_4$ or $N_2O_4$ vapor was brought into contact with titanium tetraperchlorate. In the liquid $N_2O_4$ reactions, weighed samples of titanium tetraperchlorate were placed in a reactor made of polytetrafluoroethylene which was then attached to a vacuum system and evacuated. Nitrogen dioxide ($N_2O_4$), purified by distillation so as to remove any nitric oxide until a white solid was obtained upon freezing with liquid nitrogen, was condensed on the solid tetraperchlorate until a total volume of 10–15 ml. was obtained. The reactor was then sealed and allowed to stand at room temperature for 60 hours. At the end of the 60-hour period, voluminous white solids filled approximately half of the liquid volume. Thereupon, the nitrogen dioxide was removed in vacuo and the solids dried for an additional 30 minutes. These solids were then weighed to determine the change in weight. They were then analyzed by the ceric sulfate titration procedure in which the weighed sample was added to an excess of a standard ceric sulfate solution and the excess ceric sulfate back-titrated with ferrous sulfate in the presence of o-phenanthroline indicator. In one instance, a sample was analyzed for nitrogen (by Kjeldahl) and for perchlorate (by gravimetric procedure using tetraphenyl arsonium chloride). This particular sample was found to contain 48.6 percent perchlorate and 11.2 percent nitrogen. Theoretical for the consumption of 6 moles of nitrogen dioxide per mole of tetraperchlorate is 55.1 percent perchlorate and 11.6 percent nitrogen.

In the reaction utilizing $N_2O_4$ vapor, a weighed quantity of titanium tetraperchlorate was exposed to an atmosphere of nitrogen dioxide vapor for 3–4 hours at room temperature. The results of the experiments described above are summarized in the following table.

Table.—Results of reaction of $Ti(ClO_4)_4$ with $N_2O_4$ at 25° C.

| $Ti(ClO_4)_4$ weight, g. | Product weight, g. | Weight increase, percent | $NO_2$ content, weight percent ||
|---|---|---|---|---|
| | | | By weight increase | By ceric sulfate titration |
| With liquid $N_2O_4$: | | | | |
| 0.5240 | 0.8794 | 67.8 | 40.9 | 35.6, 39.7 |
| 0.8880 | 1.5222 | 71.4 | 41.7 | 34.4, 35.4 |
| 0.5438 | 0.6993 | 28.6 | 22.2 | 20.5 |
| With $N_2O_4$ vapor: | | | | |
| 0.2393 | 0.2683 | 12.1 | 10.8 | 17.3, 17.8 |

The above results indicate that the products are most likely a mixture of $Ti(NO_3)_4$, $NOClO_4$, $Ti(ClO_4)_4 \cdot N_2O_4$, and/or $Ti(ClO_4)_4 \cdot 3N_2O_4$.

The process of this invention can be conducted at temperatures ranging from about $-78°$ C. up to about 25° C. To maximize the $Ti(ClO_4)_4 \cdot 3N_2O_4$ content in the complex product, the lower temperatures of this range are preferable. Naturally, when the nitrogen dioxide is to be used in the liquid phase, the temperature of the system should be kept low enough and pressure of the system high enough so that its boiling point under the prevailing conditions is not reached.

The amount of nitrogen dioxide utilized in the present process is not particularly critical so long as there are at least about 4 moles thereof per each mole of titanium tetraperchlorate utilized.

Titanium tetraperchlorate can be made by reacting excess anhydrous perchloric acid with titanium tetrachloride at about $-10°$ C. Further details may be found in copending application, Serial No. 176,863, filed February 26, 1962, and entitled "Chemical Compounds," now U.S. Patent 3,157,464.

The white complex titanium-, nitrogen-, and oxygen-containing products produced by the process of this invention were found to be exceedingly hygroscopic. Accordingly, they are of considerable use as drying agents where a high degree of hygroscopicity is desirable or necessary. For example, the composition of this invention can be effectively used in chemical desiccators for storage of water-sensitive chemicals. These products are also useful as nitrating agents and as oxidizers in chemical syntheses.

What is claimed is:
1. A process for the preparation of titanium-, nitrogen-, oxygen- and chlorine-containing products which comprises reacting titanium tetraperchlorate with at least four moles of nitrogen dioxide per mole of said titanium tetraperchlorate at a temperature not exceeding about 25° C.
2. The product produced by the process of claim 1.

References Cited by the Examiner
UNITED STATES PATENTS
3,063,797   11/1962   Hildreth _____ 23—85

MAURICE A. BRINDISI, Primary Examiner.
CARL D. QUARFORTH, Examiner.